(No Model.)

J. P. B. FISKE.
COMBINED TRUCK AND HOIST.

No. 518,235. Patented Apr. 17, 1894.

WITNESSES

INVENTOR
Jonathan P. B. Fiske
by Butler & Knight
Attys.

THE NATIONAL LITHOGRAPHING COMPANY,
WASHINGTON, D. C.

UNITED STATES PATENT OFFICE.

JONATHAN P. B. FISKE, OF LYNN, MASSACHUSETTS, ASSIGNOR TO THE THOMSON-HOUSTON ELECTRIC COMPANY, OF CONNECTICUT.

COMBINED TRUCK AND HOIST.

SPECIFICATION forming part of Letters Patent No. 518,235, dated April 17, 1894.

Application filed July 30, 1891. Serial No. 401,160. (No model.)

*To all whom it may concern:*

Be it known that I, JONATHAN P. B. FISKE, a citizen of the United States, residing at Lynn, in the county of Essex and State of Massachusetts, have invented a certain new and useful Improvement in a Combined Truck and Hoist, of which the following is a specification.

This invention relates to an improvement in combined trucks and hoists, and its object is to furnish means for operating the truck and hoist alternately from the same source of power, thereby reducing the size, and expense of the motive devices required.

Figure 2:
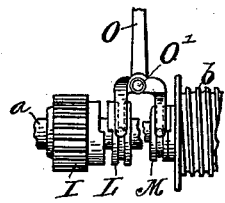
Figure 3:
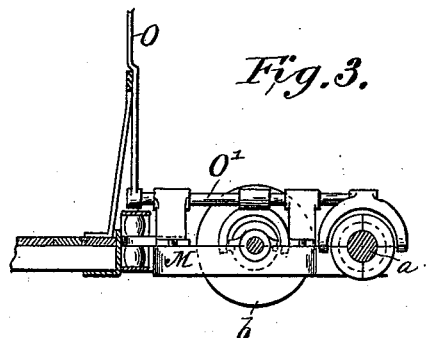
Figure 1:
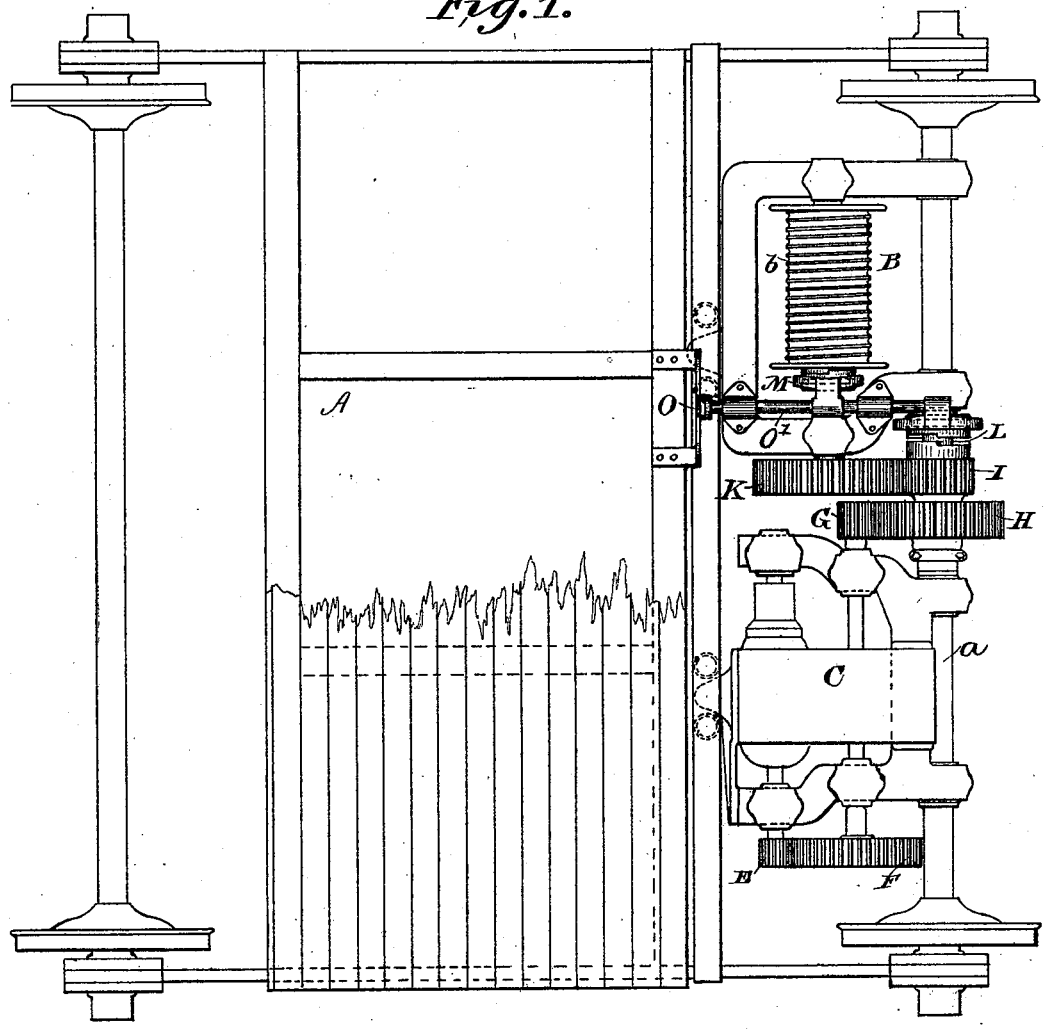

In the accompanying drawings Figure 1 is a plan view of a combined truck and hoist provided with my improvement. Fig. 2 is a side elevation and Fig. 3 is an end elevation of the clutches.

In the combined truck and hoist to which my invention is applied, the truck A and hoist B may each of them be of any usual or approved pattern, the truck being provided with axles and wheels or running gear $a$ and the hoist having a winding drum $b$. In actual operation the hoist is usually in operation only when the truck is at rest, and vice versa, so that the truck and hoist alternate in operation. It is therefore practicable to employ a single electric motor to drive alternately the truck and hoist. For this purpose I provide an electric motor C having driving connections with both the running gear of the truck and the hoist and clutches in each such connection. Such driving connections preferably consist of speed reducing gear wheels E, F, G, H, I, K, the last pair of wheels as I K giving a greater reduction to the hoist than to the truck wheels, as is found desirable in practice.

Between the truck axle $a$ and hoist shaft $b$ and the parts respectively directly driving them are the clutches L M carried on rock arms secured upon a rock shaft O' operated by a common manual lever O, said clutches being arranged reversely with respect to said lever so that by manually shifting the lever, the hoist and truck wheels can be alternately connected through their respective clutches, with the electric motor, which is thus made to serve a double function, with a corresponding decrease in cost of motor plant.

What I claim as new, and desire to secure by Letters Patent, is—

The combination with the truck, of an electric motor and a hoisting drum mounted thereon, a train of speed reducing gearing permanently connected with the motor, a rock shaft adjacent to both the truck axle and the hoisting drum, and two clutches operated reversely by said rock shaft, and serving to connect a portion of the gearing with the axle, and the entire train of gears with the hoisting drum, respectively, substantially as described.

In testimony whereof I have hereto set my hand this 27th day of July, 1891.

JONATHAN P. B. FISKE.

Witnesses:
  JOHN W. GIBBONEY,
  BENJAMIN B. HULL.